March 27, 1962   C. A. SMITH   3,027,132
SOLENOID VALVE
Filed Nov. 24, 1958   4 Sheets-Sheet 1
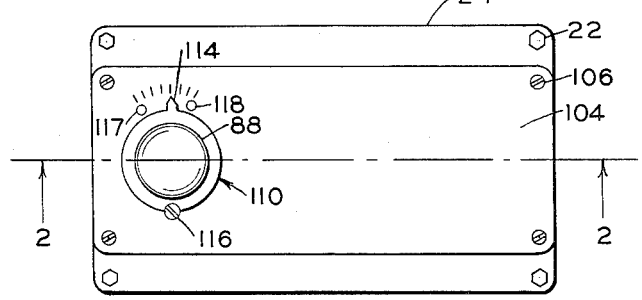
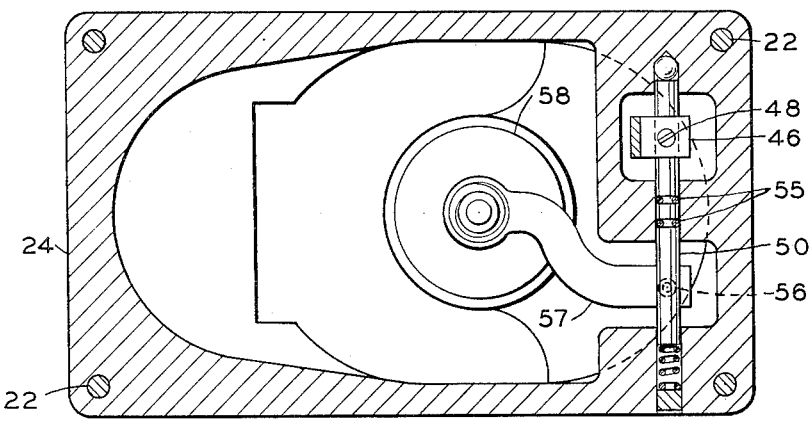
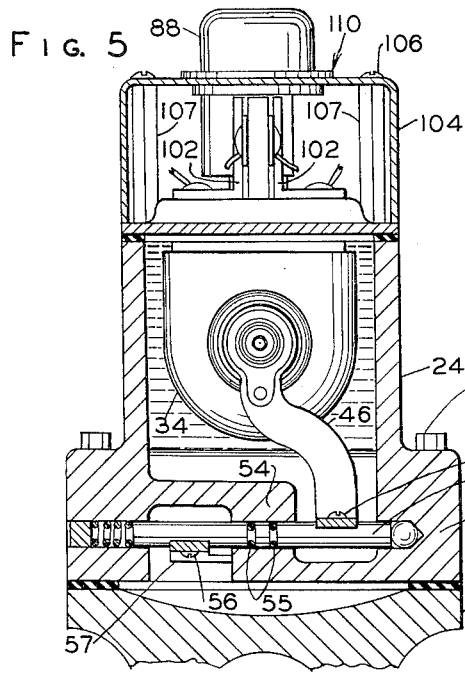
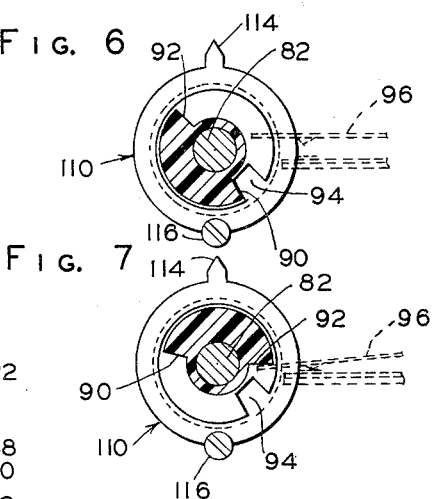
INVENTOR
CARL A. SMITH
BY Charles E. Markham
HIS AGENT March 27, 1962

C. A. SMITH 3,027,132

SOLENOID VALVE

Filed Nov. 24, 1958

INVENTOR
CARL A. SMITH
BY Charles E. Markham

HIS AGENT

March 27, 1962  C. A. SMITH  3,027,132
SOLENOID VALVE
Filed Nov. 24, 1958  4 Sheets-Sheet 3
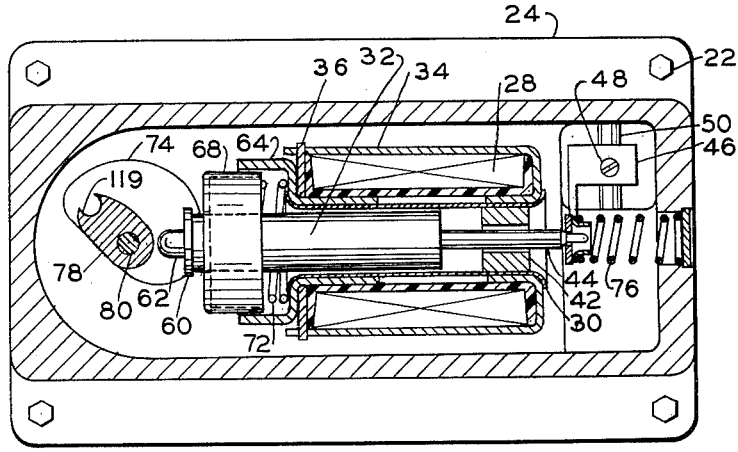
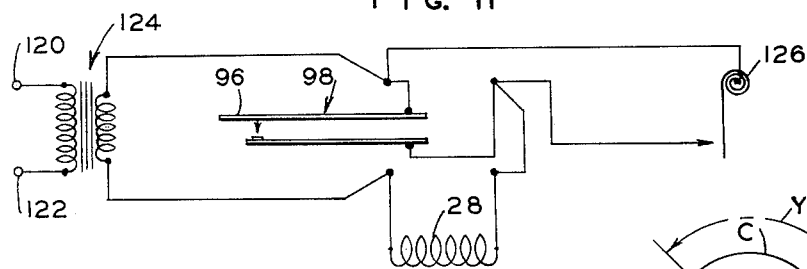
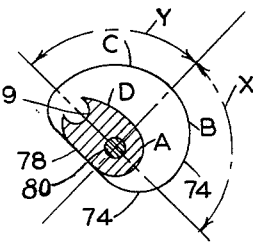
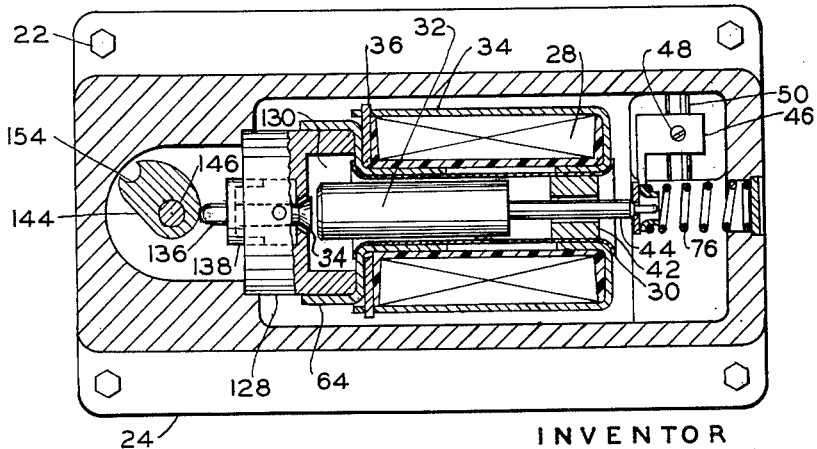
INVENTOR
CARL A. SMITH
BY
*Charles E. Markham*
HIS AGENT March 27, 1962  C. A. SMITH  3,027,132
SOLENOID VALVE Filed Nov. 24, 1958  4 Sheets-Sheet 4

INVENTOR
CARL A. SMITH
BY
*Charles E. Markham*
HIS AGENT

United States Patent Office 3,027,132
Patented Mar. 27, 1962

3,027,132
SOLENOID VALVE
Carl A. Smith, Lemay, Mo., assignor to White-Rodgers Company, St. Louis, Mo., a corporation of Delaware
Filed Nov. 24, 1958, Ser. No. 776,121
9 Claims. (Cl. 251—54)

This invention relates to A.C. solenoid valves, and particularly to solenoid gas valves for domestic heating systems which are noiseless in operation and are arranged to open in such manner when energized as to effect the full flow of gas to the burner gradually or incrementally, thereby to allow time for the establishment of a sufficient draft through the combustion chamber to support combustion of the maximum flow.

Domestic gas heating furnaces usually rely upon naturally draft for combustion air, and under cold starting conditions when there is little or no draft, the instantaneous inrush of maximum fuel flow to the combustion chamber frequently results in a momentary condition of insufficient air which may manifest itself by an objectionable roll-out of flame. This condition has been worsened by the current trend toward compact furnace designs of high heat output and relatively small combustion chambers. This undesirable condition may be avoided if upon initiating operation of the furnace, the supply of gas is gradually increased from zero to the maximum over a period of time sufficient to permit the progressing combustion to establish adequate natural draft. In installations where the burner orifice is closely associated with the fuel valve so that the time lag between initial opening of the valve and establishment of fuel flow through the burner orifice is relatively short, it will usually be necessary to open the valve part way rapidly in order to establish a minimum flame at the burner and then delay full opening of the valve in order to permit establishment of sufficient air draft to support combustion of the maximum flow. An object of the present invention is to provide a solenoid operated gas valve which, upon energization thereof, moves from closed to a partial open position at a relatively rapid rate to supply an initial limited flow of gas to a burner to initiate a limited combustion volume and then proceeds to its full open position at a relatively slow rate so as to effect a slow increase in combustion volume until a maximum is reached.

A further object is to provide a solenoid gas valve which upon energization opens partially at a rapid rate and then completes its opening at a slower rate and in which the amount of initial rapid opening movement is adjustable.

A further object is to provide a solenoid gas valve having a single manual operator which is movable oppositely within a limited range to vary the amount of initial valve opening movement and which is movable in one direction beyond the limited range to effect the manual opening of the valve.

A further object is to provide a solenoid operated gas valve in which the solenoid operator is immersed in a viscous liquid to quiet its operational noise and to retard a portion of its opening movement, but which returns upon de-energization in a valve closing direction at a constant and relatively rapid rate.

A further object is to provide a new and improved A.C. solenoid gas valve which is quiet in operation and may be selectively opened at a predetermined rate.

A further object is to provide a solenoid operated gas valve having a single manual operator which is movable oppositely within a limited range to vary the speed at which the valve opens and which is movable in one direction beyond its speed adjusting range to effect the manual opening of the valve.

Further objects and advantages will appear from the following description when read in connection with the accompanying drawings.

In the drawings:

FIG. 1 is a top plan view of a solenoid valve constructed in accordance with the invention;

FIG. 3 is a cross-sectional view taken on line 3—3 of FIG. 2;

FIG. 4 is a cross-sectional view taken on line 4—4 of FIG. 2;

FIG. 5 is a cross-sectional view taken on line 5—5 of FIG. 2;

FIG. 6 is a part sectional view taken on line 6—6 of FIG. 2, showing the manual adjustment knob in a returned position against the adjustable stop member;

FIG. 7 is a similar part sectional view showing the manual adjustment knob in a valve opening position;

FIG. 9 is a cross-sectional view taken on line 9—9 of FIG. 8;

FIG. 10 is a diagrammatic view of speed regulating and manual operating cams;

FIG. 11 is a diagrammatic view of a conventional gas burner control system illustrating the operation of the automatic reset switch.

Figure 2:
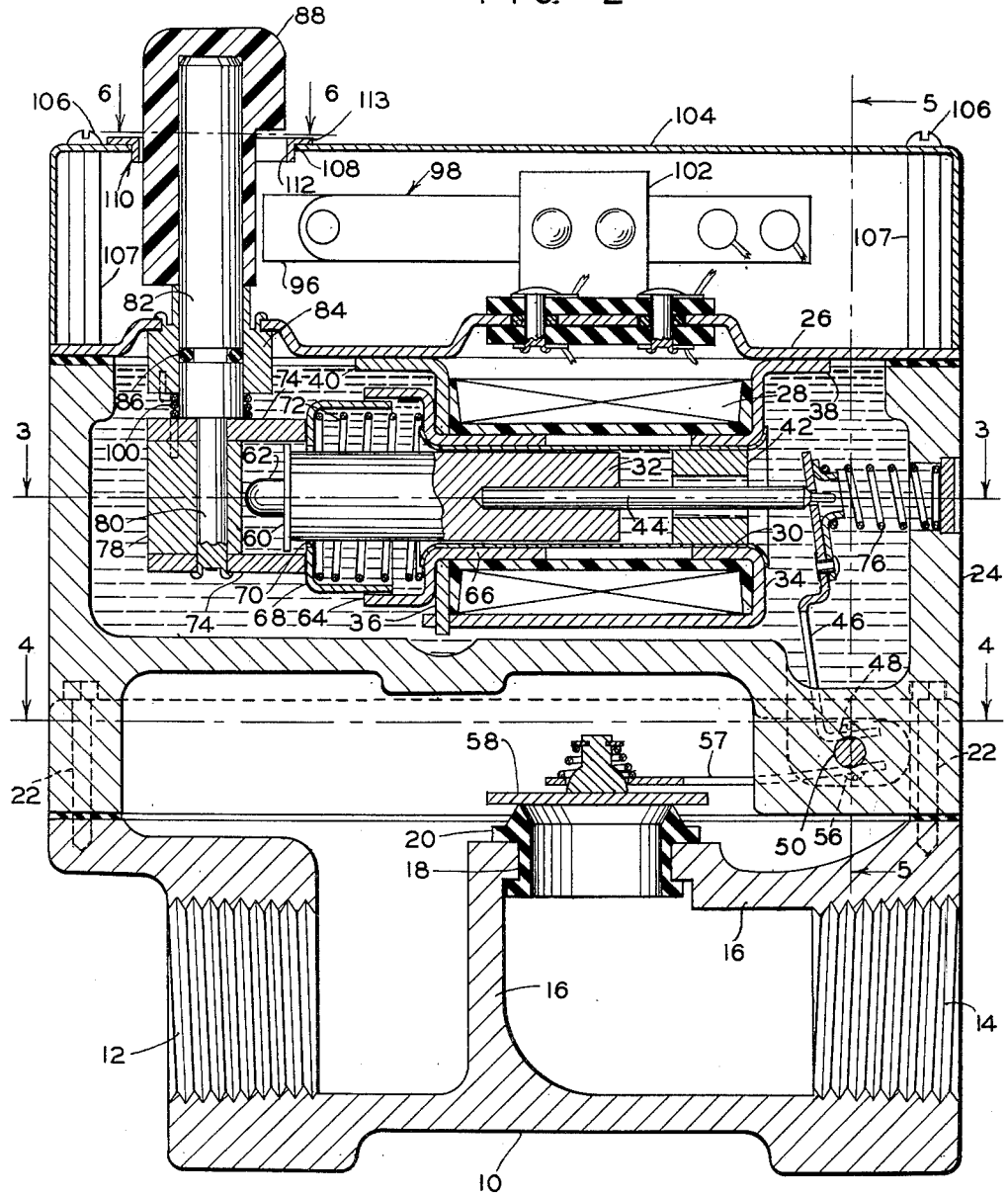
FIG. 2 is a cross-sectional view taken on line 2—2 of FIG. 1.

Referring to a first form of the invention shown in FIGS. 1 to 7 of the drawings, numeral 10 indicates a valve body having an inlet 12, an outlet 14, and a partition 16. The partition 16 has a port 18 therein into which is fitted a resilient valve seat 20. Mounted on the valve body 10 and attached thereto by screws 22 is an upper casing 24 which houses a solenoid actuator. The casing 24 is filled with a viscous liquid and is provided with a sealing top cover 26 of magnetic material from which the solenoid actuator is suspended. The solenoid actuator comprises a winding 28, a central plunger guide sleeve 30 of non-magnetic material, and a plunger 32 slidable in the guide sleeve. The solenoid winding is enclosed in a supporting frame of magnetic material consisting of members 34 and 36, each having a formed leg, 38 and 40 respectively, attached to the under side of cover 26 in any suitable manner as by welding. A centrally perforated plunger stop member 42 of magnetic material fixed in the right end of guide sleeve 30 limits the travel of plunger 32 when winding 28 is energized and completes with the plunger and frame members 34 and 36 and cover 26 a low reluctance path for the magnetic field generated by winding 28.

A push rod 44 projecting axially from the right end of plunger 32 and extending through stop member 42 engages the free end of an arm 46. The arm 46 is attached at its other end by a screw 48 to the interiorly extending portion of a rocking shaft 50 which is journalled in opposite walls 52 and 54 of the casing and extends interiorly and exteriorly of casing 24 through the wall 54, see FIG. 5. In order to provide a seal against leakage of the liquid in casing 24, the portion of shaft 50 extending through the wall 54 is provided with a pair of synthetic rubber O rings 55 which are fitted in annular grooves in the shaft. Attached at one end to the exterior projecting portion of shaft 50 by a screw 56 is a second arm 57 which carries at its free end a valve 58 which cooperates with the valve seat 20 to control the flow of fluid through valve body 10.

The left end of plunger 32 extends outwardly beyond the end of guide sleeve 30 and is provided with a head 60 and an axially extending pin 62. The projecting end of plunger 32 is surrounded by the enlarged diameter end portion 64 of a sleeve member which has a smaller diameter portion 66 fitted over the left end portion of guide sleeve 30. Slidably fitted in the enlarged sleeve portion 64 is a cup member 68 having a central perforation 70 in the bottom wall thereof through which the plunger 32 freely passes. A spring 72 biases the sliding cup 68 outward against the surfaces of a pair of outer cam members 74. A spring 76 acting on the free end of arm 46 biases valve 58 in a closed position on its seat 20 and acting through rod 44 returns plunger 32 leftward, in FIG. 2, to its de-energized position. The pin 62 at the left end of plunger 32 bears against the surface of an inner cam member 78 under certain conditions.

The inner and outer cam members 78 and 74 are rigidly mounted in fixed angular relationship on the inner reduced end 80 of a shaft 82. The shaft 82 is journalled in a bushing 84 and extends interiorly into the casing 24 and exteriorly thereof. The bushing 84 is mounted in the casing cover 26 and a rubber sealing ring 86 is provided and is fitted in a suitable annular groove in shaft 82. The shaft 82 is further provided with a knob 88 of insulating material fixed on its exteriorly projecting end. A portion of the length of knob 88 is substantially semi-circular in cross-section, thereby providing opposed abutments 90 and 92, see FIGS. 6 and 7. The abutment 90 engages a stop 94 to limit counterclockwise rotation of the knob and, consequently, of shaft 82, and the abutment 92 engages a switch blade 96 to close a switch generally indicated at 98 as the knob is rotated clockwise a predetermined amount. A spring 100 connected at one end to cam member 74 and connected at its other end to fixed bushing 84 biases the shaft 82 and knob 88 in a counterclockwise direction against stop 94.

The switch 98 is mounted on the upper surface of casing cover 26 by means of angularly formed insulating brackets 102 and is enclosed by a stamped cover 104 attached to actuator casing 24 by screws 106. The screws 106 extend into the casing 24, and spacers 107 are provided so that the screws also firmly clamp the cover 26 of the casing 24. The stamped cover 104 has a circular perforation 108 through which knob 88 projects. Fitted into this circular perforation is a ring member generally indicated at 110 having a short, cylindrical portion 112 which fits into the perforation 108 and a flange portion 113 which overlays the upper surface of cover 104. The stop 94 is formed as an integral projection of the ring member extending radially inward from the flange 112. The ring member 110 is further provided with a pointer element 114 to indicate the angular position of stop 94 with reference to indicia on the cover 104. The ring member 110 is fixed in any adjusted position by a clamping screw 116. The range of adjustment of ring 110 is limited by a pair of stops 117 and 118 mounted in the cover 104, see FIG. 1.

Referring to FIGS. 3 and 10, inner cam member 78 has a dwell A coincident with a rise B on cams 74 through the angle X, and cams 74 have a dwell C coincident with a rise D on cam 78 through the angle Y. When the cams 74 and 78 are rotated with reference to plunger pin 62 through the angle X in one direction or the other, the sliding cup member 68 is moved to the left or right relative to plunger head 60, the plunger being unmoved due to the dwell A on inner cam 78. When the cams are rotated through angle Y in one direction or the other with reference to pin 62, the plunger 32 is moved to the left or right, while sliding cup member 68 is unmoved by cams 74 through this angle of movement due to the dwell C on cams 74.

FIGS. 2 and 3 show the valve and actuator in a closed and de-energized position. Upon energization of winding 28, plunger 32 moves toward the right. The initial movement of the plunger is relatively rapid because that portion of the viscous liquid fill between the right end of the plunger and plunger stop 42 passes freely through the relatively large perforation in the stop member, and the plunger head 60, being freely movable in the liquid fill, effects no retarding of the plunger. When the plunger has moved toward the right sufficiently for plunger head 60 to engage the bottom of cup 68, the liquid in the chamber formed by the enlarged sleeve portion 64 and cup 68 must either pass between the plunger and its guide sleeve or between the side walls of cup member 68 and the walls of enlarged sleeve portion 64 as the plunger continues its rightward movement. Note that the plunger head 60 closes the perforation 70 when it engages the bottom wall of cup 68. The clearance between plunger 32 and its guide sleeve 30, and between cup 68 and enlarged sleeve portion 64, is such that the speed of the plunger is considerably reduced when the plunger head 60 contacts cup 68, and as a result, the valve 58 is opened partially at a relatively rapid rate while the remainder of its opening movement is relatively slow. When the winding 28 is de-energized, the plunger and valve 58 return to their biased positions at a relatively rapid rate. In returning the plunger head 60 leaves the bottom of cup 68 and permits flow through the perforation 70, which effects a rapid return of cup 68.

When ring member 110 is adjusted in a clockwise direction with reference to FIGS. 1, 3, 6, and 7, the stop 94 will cause cams 74 to be positioned so as to press cup member 68 further into the enlarged sleeve portion 64 and therefore increase the gap between the plunger head 60 and the bottom of cup 68. This results in the plunger traveling a greater distance upon energization before engaging cup 68, thereby increasing the amount of initial rapid opening movement of the valve. When stop 110 is adjusted in a counterclockwise direction, it will reduce the initial rapid opening movement.

If the available power source for operation of the valve is interrupted for any reason and it is desired to open the valve manually, the knob 88 is rotated clockwise sufficiently to include the angular movement Y in FIG. 10. The cam 78 is provided with a circular indentation 119 substantially conforming to the hemispherical end of plunger pin 62 so that, when the cam 78 is rotated clockwise sufficiently, the end of pin 62 enters the groove 119 under the urging of return spring 76, thereby providing detention against the return of the cam by spring 100. This detent arrangement, while adequate to hold the plunger and cam in a valve opening position, yields to the manual application of a moderate torque at the knob 88 to release it.

If the supply of electrical power is resumed while the valve is held open in this manner, the plunger will move slightly further to the right, in FIGS. 2 and 3, under electromagnetic attraction. This slight movement will be sufficient to disengage the plunger from detent groove 119 and permit the counterclockwise return of cams 78 and 74. The rise D on cam 78 is made slightly less than sufficient to move the plunger through its full stroke.

It frequently occurs that upon the resumption of electrical power, following burner operation under manual operation of the valve, the controlling thermostat is in an open, satisfied condition, thereby breaking the energizing circuit for winding 28. Inasmuch as the thermostat once opened would stay open as long as the burner continued to operate, some means must be provided to assure energization of winding 28 and thereby trip the latch-up of the plunger. To accomplish this the switch 98 is provided. When the knob 88 is rotated clockwise sufficiently to latch the plunger in a valve opening position, the switch blade 96 is engaged by the stop 92 on the knob and depressed so as to close the switch contacts, see FIGS. 6 and 7. The closing of switch 98 completes a shunt circuit around the thermostat to effect energization of winding 28 and tripping of the latch. The switch 98 immediately opens and becomes inoperative when the latch is tripped, and the knob returns to its biased position against stop 94.

The wiring diagram, FIG. 11, shows power source terminals 120, 122, a transformer 124, switch 98, a thermostat 126, and solenoid actuator winding 28. Normally the winding 28 is energized when the thermostat 126 is in a closed position. When the power source fails, and the valve is opened and latched open manually by turning knob 88, the normally open switch 98 is closed completing a shunt circuit for winding 28.

Figure 8:
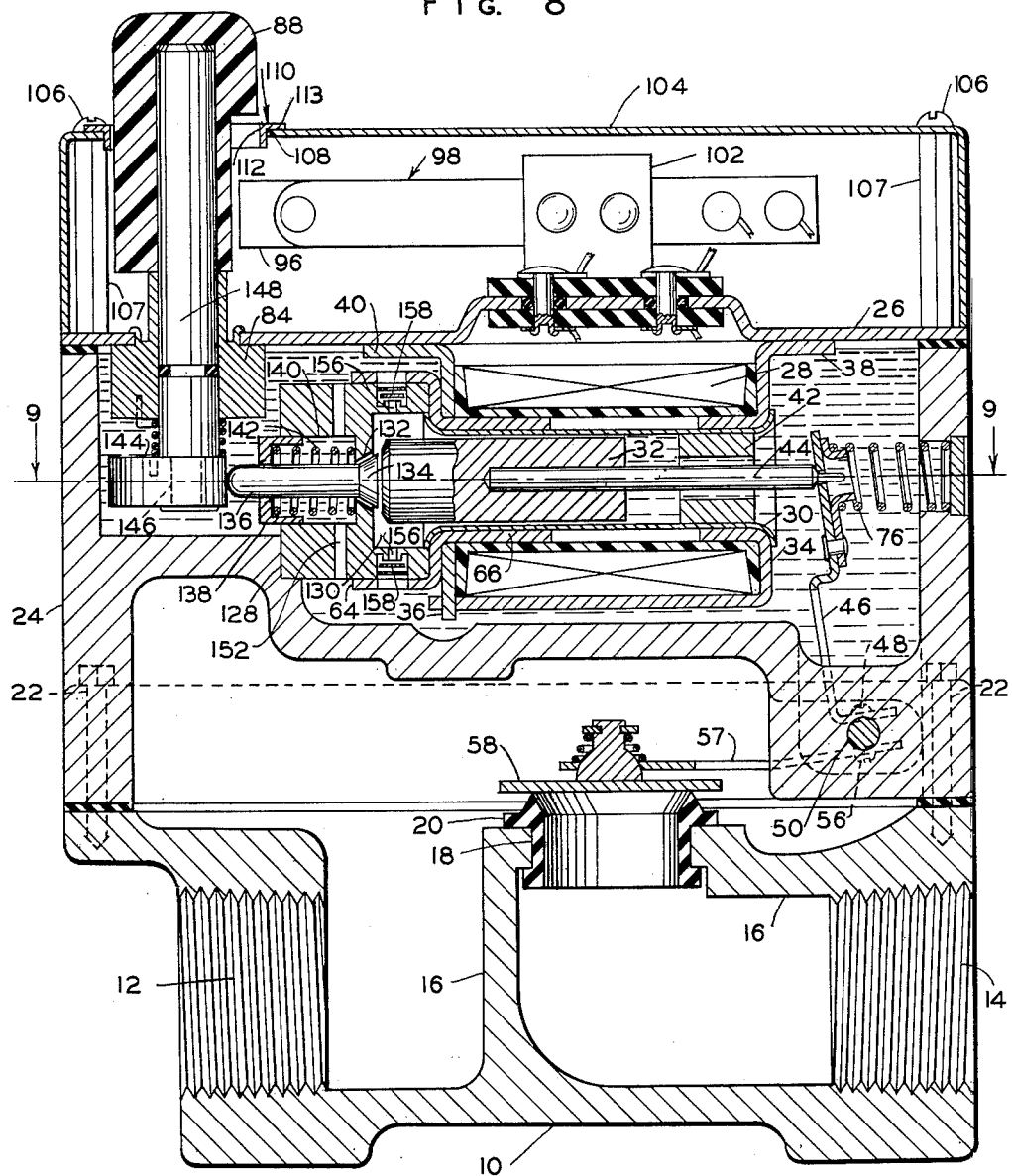
FIG. 8 is a longitudinal cross-sectional view of a second form of the present invention.

A second form of the invention is disclosed in FIGS. 8 and 9 of the drawings. In this form of the invention the entire opening movement of the valve occurs at a substantially constant rate which may be selectively varied to suit conditions. With the exception of elements to now be described, all other elements in FIGS. 8 and 9 are similar to those described in connection with the first form of the invention and are similarly designated.

Referring to FIGS. 8 and 9, a cylindrical member 128 is fixed in the enlarged sleeve portion 64. Member 128 has a bore forming a chamber 130 at the left end of guide sleeve 30. The chamber 130 has a tapered opening 132 controlled by a tapered valve 134. The valve is provided with a stem 136 having a guide flange 138 attached thereto which slidably fits a guide bore 140 in member 128. A spring 142 acting on guide flange 138 biases valve 134 in a closing direction. The stem 136 projects beyond the flange 138 and bears against the surface of a radial cam 144 rigidly attached to the reduced end 146 of a shaft 148.

The member 128 may be provided with transverse holes 152 to permit the free flow of fluid to the guide bore 140. The cam 144 has a clockwise rise, with reference to FIG. 9, and a circular recess 154 adapted to receive the hemispherical end of valve stem 136. The chamber 130 is provided with transverse passages 156 in which are mounted check valves 158.

In this form of the invention the rate of opening of valve 58 is determined by the position of valve 134. When ring member 110 is adjusted so that stop 94 is moved in a clockwise direction, the valve 134 is moved in an opening direction by cam 144. This permits a more rapid flow of fluid into chamber 130. The relationship of the left end of plunger 32 and valve 134 when the plunger is in its leftwardmost position is such that valve 134 may be moved toward the right to a full open position before engaging the end of the plunger. When the solenoid is de-energized, liquid flows through passages 156 and around check valves 158 to permit a relatively rapid valve-closing movement.

When it is desired to open the valve 58 manually, the knob 88 is rotated clockwise sufficiently to effect engagement of the valve 134 with the end of plunger 32. When the knob is rotated sufficiently the hemispherical end of valve stem 136 will enter the circular recess 154 and latch plunger 32 in a valve opening position. A portion of the rise of cam 144 is, therefore, used to position the valve 134 and another portion to move the plunger to a position to open valve 58. Thus, a single manual operating knob is employed for varying the valve opening movement when operating electrically and for manually opening the valve when electrical power fails.

The foregoing description is intended to be illustrative and not limiting, the scope of the invention being set forth in the appended claims.

I claim:

1. In a solenoid valve, a valve body having a port therein, a chamber, a detachable cover for said chamber, a solenoid actuator attached to said cover and extending into said chamber, a liquid in said chamber surrounding said solenoid actuator to reduce operational noise, a shaft extending exteriorly and interiorly through a wall of said chamber, a pliable sealing ring surrounding that portion of the shaft extending through the chamber wall, means forming a readily detachable, operative connection between the interior end of said shaft and said solenoid whereby the shaft is rotated by said actuator, an arm attached at one end to the exterior end of said shaft, and a valve member carried by the free end of said arm co-operating with said port.

2. In a solenoid valve, a valve body, a valve in said body for controlling flow therethrough, a chamber adjacent said valve body, a wall separating said chamber and said valve body, a detachable cover for said chamber, a solenoid actuator in said chamber, said solenoid actuator being attached to and supported by said chamber cover thereby to be readily removable from said chamber, a shaft journalled in said separating wall and extending into said chamber and into said valve body, a liquid in said chamber surrounding said solenoid actuator to reduce its operational noise, a pliable sealing member surrounding said shaft within said journal, means in said chamber forming a detachable operative connection between said solenoid actuator and said shaft for oscillating said shaft about its axis, and an arm on said shaft in said valve body connected to said valve for operating said valve.

3. In a solenoid valve, a chamber containing a liquid, a valve body having a port therein, a valve member exterior of said chamber cooperating with said port, a solenoid valve actuator in said chamber immersed in said liquid, said solenoid including a plunger guide sleeve, a winding surrounding said guide sleeve, and a plunger slidably arranged in said guide sleeve, means extending through the wall of said chamber for operatively connecting one end of said plunger with said valve member, means biasing said plunger and said operatively connected valve member in a de-energized and valve closed position, an abutment at the other end of said plunger, dash-pot means in said chamber and disposed adjacent said other end of said plunger for retarding movement of said plunger in a valve opening direction when said winding is energized, said dash-pot including a wall movable along the axis of said plunger and adapted to be engaged by said plunger abutment, and a manually rotatable member for variably spacing said movable wall from said plunger abutment when said plunger is in its de-energized position, thereby to vary that portion of the total plunger stroke which is retarded, and for manually moving said plunger in a valve opening direction in the absence of electrical power, said manually rotatable member having a first cam means for engaging said movable dash-pot wall and a second cam means for engaging said other end of said plunger, and said cams being of such form and being fixed on said manual member in such angular relationship that adjustment of said movable wall and opening movement of said plunger are separately effected as said manual member is turned through different portions of a revolution.

4. In a solenoid valve, a valve body having a passage therethrough, a valve member cooperating with said passage, a chamber containing a liquid, a solenoid actuator in said chamber immersed in said liquid, said solenoid including a plunger guide sleeve having an expansible chamber of enlarged diameter forming a closure at one end thereof and including an end wall movable along the axis of the sleeve, a winding surrounding said sleeve, and a plunger slidably mounted in said guide sleeve, said plunger being biased toward said movable end wall and being arranged to be moved toward the open end of said sleeve by electromagnetic attraction when said winding is energized, means providing a lost motion, one-way connection between one end of said plunger and said movable wall operative to move said movable wall with said plunger when said winding is energized, and means operatively connecting said valve with the other end of said plunger.

5. In a solenoid gas valve, a valve body having a passage therethrough, a valve member cooperating with said passage, a chamber containing a liquid, a solenoid actuator in said chamber immersed in said liquid, said solenoid including a plunger guide sleeve, means forming an enlarged chamber at one end of said guide sleeve including a centrally apertured movable end wall movable along the axis of said guide sleeve, means normally biasing said movable wall outwardly of said end of said sleeve and adjustable stop means for limiting the outward movement of said movable wall, a winding surrounding said guide sleeve and a plunger slidably mounted in said guide sleeve and extending at one end through the central aperture of said movable end wall, said aperture in said end wall being of larger diameter than the end portion of said plunger extending therethrough, said plunger being normally biased in a direction toward said movable end wall and being arranged to be attracted in an opposite direction toward the other end of said sleeve when said winding is energized, stop means for limiting the movement of said plunger in the direction in which it is biased, a flange at said end of said plunger which extends through said movable wall aperture forming a one-way operative connection between said plunger and said movable wall and forming a complete closure of said central wall aperture when said plunger is moved by electromagnetic attraction, means for moving said adjustable stop means thereby to vary the spacing between said movable wall and said plunger flange when said winding is de-energized, and means forming an operative connection between said plunger and said valve member.

6. In a solenoid gas valve, a valve body having a passage therethrough, a normally closed valve cooperating with said passage, a solenoid actuator comprising a plunger guide sleeve, a winding surrounding said guide sleeve, means forming an expansible chamber at one end of said guide sleeve including a centrally apertured movable wall movable along the axis of said guide sleeve, means biasing said movable wall outwardly, a plunger slidably mounted in said guide sleeve and having one end thereof extending through said wall aperture, means normally biasing said plunger in an outward direction toward said movable wall and said plunger being arranged to be moved oppositely toward the other end of said sleeve by electromagnetic attraction when said winding is energized, a flange on said extending end of said plunger forming a one-way connection between said plunger and said movable wall and effecting a seal of said central aperture when said plunger is moved toward the other end of said sleeve when said winding is de-energized, means operatively connecting the other end of said plunger with said normally closed valve to effect the opening thereof when said winding is energized, a movable member, a first cam means on said movable member for engaging said movable wall to variably limit its outward movement under its bias, a second cam means on said movable member adapted to engage the extending end of said plunger to limit its outward movement under its bias and to move the plunger oppositely in a valve opening direction against its bias, each of said cam means having a dwell portion thereon and a rise portion thereon and the dwell portions of each cam means being in phase with the rise portion of said other cam means, whereby said movable member may be moved through one range of movement to variably limit the outward movement of said movable wall with respect to a predetermined outwardly biased position of said plunger flange, and whereby said movable member may be moved through another range of movement to effect movement of said plunger in a valve opening direction.

7. A device as set forth in claim 6 in which the rise portions on said first and second cam means are both arranged to progressively rise as said movable member is moved in one direction, in which operative association of the rise portion of said first cam means occurs first when said movable member is moved in said one direction, in which said movable member is biased to return in a direction opposite to said one direction, and in which adjustable stop means is provided to adjustably limit the return of said movable means through the range of movement thereof in which the rise portion on said first cam means is operatively associated with said movable wall.

8. In a solenoid valve, a valve body having a passage therethrough, a valve member cooperating with said passage, a chamber containing a liquid, a solenoid actuator in said chamber immersed in said liquid, said solenoid including a plunger guide sleeve having a closure at one end comprising an end wall movable along the axis of the sleeve and being biased toward said one end, a winding surrounding said guide sleeve and a plunger slidably mounted in said guide sleeve, said plunger being biased toward said closed end of said sleeve and being arranged to be moved toward the open end thereof by electromagnetic attraction when said winding is energized, said movable end wall having a perforation therein and said plunger having a portion thereof extending through said end wall, a flange on said extending portion of said plunger adapted to engage said movable wall as said plunger moves toward the open end of said sleeve, spaced stop means at said one end of said guide sleeve for positioning said movable wall and said projecting flanged end of said plunger in spaced relationship when said plunger is de-energized, and means operatively connecting the other end of said plunger with said valve member.

9. In a solenoid valve, a valve body having a passage therethrough, a valve member controlling the flow through said passage, a chamber containing a liquid, a solenoid actuator in said chamber immersed in said liquid, said solenoid including a plunger guide sleeve closed at one end, a winding surrounding said guide sleeve, and a plunger slidably mounted for reciprocation in said guide sleeve and arranged to be moved by electromagnetic attraction in a direction from the closed end toward the open end of said guide sleeve when said winding is energized, means operatively connecting said plunger to said valve member whereby said valve is moved openward as said plunger moves toward the open end of said sleeve, means biasing said plunger toward the closed end of said sleeve and said operatively connected valve toward a closed position, a port in the closed end of said sleeve, and a single manual operator for varying the speed of opening of said valve under electromagnetic attraction and for manually opening said valve in the absence of electrical power for energizing said winding, said manual operator including a member extending through said port and being movable along the axis of said plunger, said member having an enlarged portion thereon which when entered into said port restricts the flow of liquid therethrough, and said member being adapted to engage the end of said plunger thereby to open said valve as said member is moved manually toward the open end of said sleeve.

References Cited in the file of this patent

UNITED STATES PATENTS

| 1,730,688 | Rippl | Oct. 8, 1929 |
| 2,121,392 | Ashworth | June 21, 1939 |
| 2,159,405 | Schubert | May 23, 1939 |
| 2,622,622 | Ray | Dec. 23, 1952 |
| 2,757,321 | Wallace | July 31, 1956 |
| 2,852,224 | Salden | Sept. 16, 1958 |
| 2,922,614 | Nickells | Jan. 26, 1960 |
| 2,923,519 | Ray | Feb. 2, 1960 |

FOREIGN PATENTS

| 518,206 | Italy | Mar. 5, 1955 |